J. A. GUTZEIT.
PLANTER.
APPLICATION FILED NOV. 18, 1913.
1,096,363.
Patented May 12, 1914.
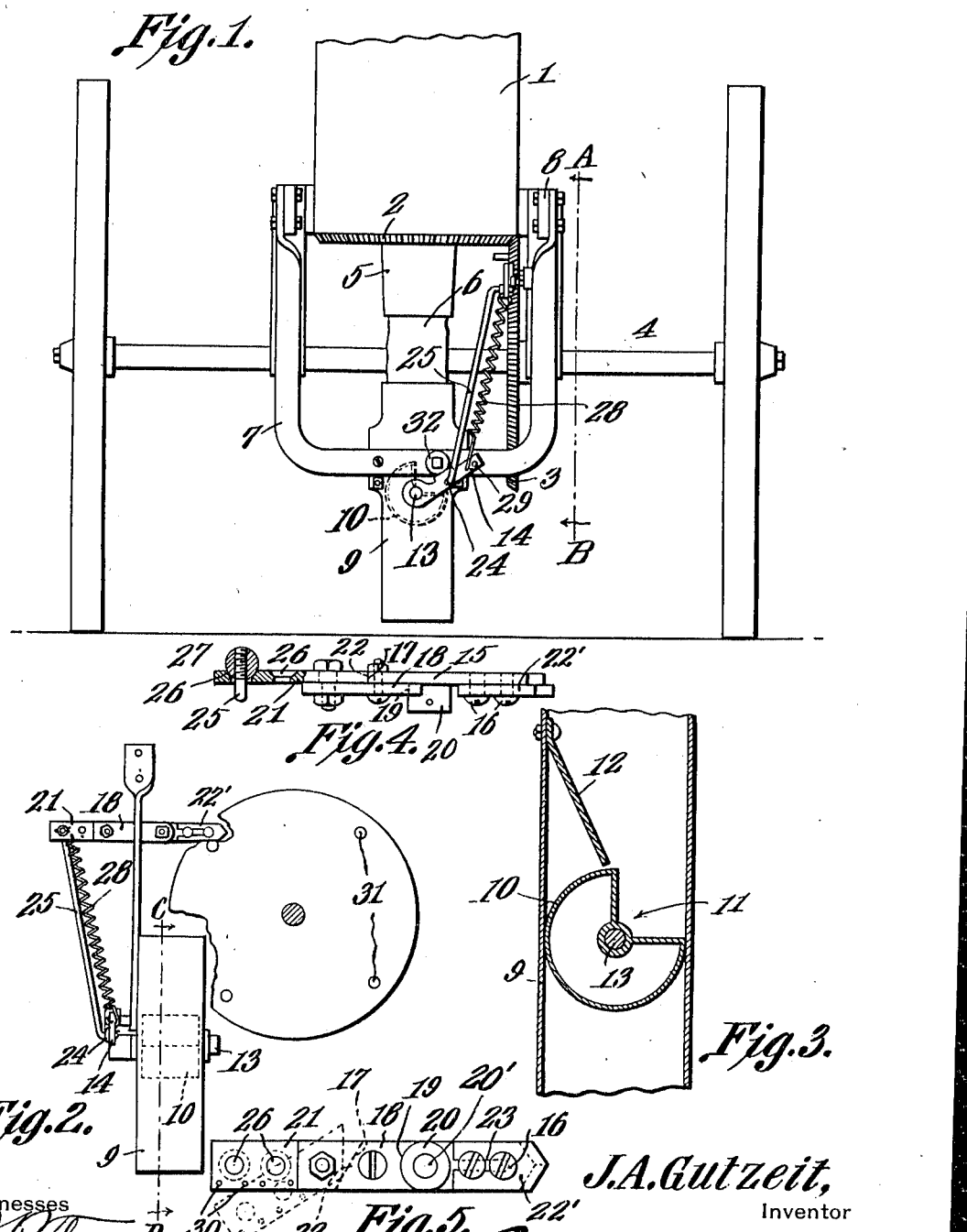
J. A. Gutzeit,
Inventor

UNITED STATES PATENT OFFICE.

JOSEPH A. GUTZEIT, OF SAN ANTONIO, TEXAS.

PLANTER.

1,096,363.  Specification of Letters Patent.  Patented May 12, 1914.

Application filed November 18, 1913. Serial No. 801,677.

*To all whom it may concern:*

Be it known that I, JOSEPH A. GUTZEIT, a citizen of the United States, residing at San Antonio, in the county of Bexar and State of Texas, have invented a new and useful Planter, of which the following is a specification.

This invention relates to attachments for planters and more particularly to means for use in connection with ordinary cotton planters whereby any desired number of seeds may be collected and then dropped in hills, so that the sprouts from the seeds will more readily break through a hard crust than where the seeds are planted thinly in continuous rows, the latter method of planting requiring special means for loosening the crust so that sprouting will not be retarded.

Another object is to provide an attachment of this character which can be applied readily to an ordinary form of planter and which is to be used in connection with the usual seed dropping mechanism.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a rear elevation of a portion of a planter and showing the present improvements combined therewith. Fig. 2 is a section on line A—B Fig. 1, parts of the gear being broken away. Fig. 3 is a section on line C—D Fig. 2. Fig. 4 is a plan view of the actuating lever. Fig. 5 is a side elevation of the lever, the joint between the two members thereof being shown broken, by dotted lines.

Referring to the figures by characters of reference 1 designates the seed box of a planter, the same being provided with a dropping plate in the form of a gear 2 which receives motion, as ordinarily, through a gear 3 from the rotating axle 4 of the planter. The seed box is provided with the usual outlet sprout 5 from which depends a flexible tube 6.

The parts herein described do not constitute any part of the present invention, specifically, but can already be found on some types of planters.

The attachment constituting the present invention includes a yoke-like frame 7, the terminals of which are adapted to be secured to the main frame 8 of the planter, this yoke or frame 7 being supported under the rear portion of the seed box 1. A boot 9 is bolted or otherwise secured to the frame 7, this boot being preferably rectangular in cross sectional contour. The tube 6 discharges into the upper end of the boot while the lower end of the boot is supported close to the ground. Mounted for oscillation in the boot is a segmental rotary valve 10 formed with a segmental recess 11. A guide plate 12 is mounted in the boot so as to overhang approximately one half of the valve, this plate serving to direct seeds into the segmental recess 11 when the valve is in its normal position, as shown in Fig. 3. Valve 10 has a stem 13 which extends beyond one wall of the boot and secured to this stem is an arm 14.

Pivotally mounted upon one side of the frame 7 and preferably back of the gear 3 is a lever 15 one arm of which has binding screws 16 connected thereto while the other end is beveled, as shown at 17. A strip 18 is secured to one side of the beveled arm of the lever, this strip having a recessed end 19 designed to fit against the boss 20 formed on the lever and which is designed to receive the pivot bolt 20′. A strip 21 is pivotally connected to strip 18 and has a beveled end 22 adapted to bear against the beveled end 17 when strip 21 is in alinement with the lever 15. An extension strip 22′ is engaged by the binding screws 16, this extension strip being formed with a slot 23 through which the screws extend. By shifting the strip 22 longitudinally the lever can be elongated or shortened as desired.

Arm 14 is connected by a suitable ball and socket joint 24, to a connecting rod 25 and this rod is, in turn, connected by a suitable ball and socket joint to the strip 21. The rod 25 can be adjusted to two or more positions upon the strip 21, as will be apparent by referring to Fig. 4. In this figure the sockets in the strips 21 have been indicated at 26 and a ball nut 27 has been shown in engagement with the offset end of the rod 25. Obviously, by removing the ball 27 the same can be placed into any of the sockets and then secured to the rod 25.

A coiled spring 28 is secured at one end to the arm 14 and at its other end to strip 21, there being a series of openings 29 in the arm 14, any one of which is adapted to receive the end of the spring, while another series of openings 30 is formed in the strip 21, any one of these last named openings being adapted to receive the other end of the spring. The extension strip 22 on the lever 15 projects into the path of a series of tappets 31 extending from the gear 3. These tappets can be placed at any desired distances apart and any preferred number of them can be used.

When the attachment is in position the spring 28 pulls on arm 14 so as thus to hold the valve in the position shown in Fig. 3 and the arm 14 pressed against a buffer 32 of rubber or other suitable material extending from the frame 7. The spring and the rod 25 also coöperate to hold the lever 15 extended horizontally with the extension strip 22 projecting into the path of the tappets 31. As the machine moves forward, gear 3 will rotate the dropping plate or gear 2 so that seeds will be dropped intermittently into spout 5 and thence into the boot 9 where they will become deposited in the recess 11. After a predetermined number of seeds have thus been dropped into the boot 9, one of the tappets 31 will come against the extension 22' of lever 15 and push it upwardly. Thus the strip 21 will be caused to push downwardly through rod 25 against arm 14 to cause said arm to swing downwardly away from buffer 32. Consequently valve 10 will be actuated and the seeds which may have been deposited in the recess 11 will then be discharged into the lower portion of the boot 9 and, consequently, into the furrow provided for them. As soon as the tappet pin 31 has passed the strip 22', the spring 28 will return the lever 15 and the arm 14 and valve 10 to their initial positions whereupon the operation will be repeated as before. Should the machine be moved backwardly, one of the tappets 31, upon moving against the strip 22' will press said strip downwardly but, as the outer end of the strip 21 is held by the rod 25, it will be seen that the joint between the strip 21 and lever 15 will be broken, the parts assuming the relative positions indicated by dotted lines in Fig. 5.

Consequently the tappets will be free to pass the lever 15 without operating the mechanism or causing injury to any of the parts thereof.

While an oscillatory valve has been described and shown, it is to be understood that any other form of valve desired may be used where it is possible to actuate it by means of the mechanism herein described.

What is claimed is:—

1. An attachment for planters including a boot, means for supporting the same in position to receive seeds from the dropping mechanism of the planter, a segmental valve mounted for oscillation within the boot, a spring controlled arm connected to the valve for holding the valve normally closed, a buffer for limiting the movement of the valve to closed position, said buffer coöperating with the arm, a lever, a connection between the lever and arm, means operated by the seed dropping mechanism for intermittently actuating the lever to oscillate the valve, the spring controlled arm of the lever constituting means for supporting the lever normally in the path of said actuating means.

2. An attachment for planters including a boot, means for supporting the same in position to receive seeds from the dropping mechanism of the planter, a segmental valve mounted for oscillation within the boot, a spring controlled arm connected to the valve for holding the valve normally closed, a buffer for limiting the movement of the valve to closed position, said buffer coöperating with the arm, a lever, a connection between the lever and arm, means operated by the seed dropping mechanism for intermittently actuating the lever to oscillate the valve, the spring controlled arm of the lever constituting means for supporting the lever normally in the path of said actuating means, said lever including an extensible pivoted strip projecting beyond one end of the lever and into the path of the actuating means, said strip being adapted to yield under the action of the actuating mechanism when the movement of said mechanism is reversed.

3. The combination with a planter including a revoluble axle, a gear revoluble with the axle, a seed plate actuated by the gear, and an outlet spout, of a boot for receiving seeds from the spout, a valve mounted for oscillation in the boot, an arm movable with the valve, a spring for holding the arm and valve normally in predetermined positions, a lever, a connection between the lever and arm, the spring and arm operating to hold the connection and lever normally in predetermined positions, and an actuating device extending from the gear on the shaft and movable against one end of the lever to oscillate the lever and open the valve, said lever including an extensible end portion for engagement by said means on the gear, the said lever being made up of pivotally connected portions adapted to fold when the rotation of the actuating gear is reversed.

In testimony that I claim the foregoing as my own, I have hereto affixed my signature in the presence of two witnesses.

JOSEPH A. GUTZEIT.

Witnesses:
E. A. WEST,
CHAS. X. GUTZEIT.

Copies of this patent may be obtained for five cents each, by addressing the "Commissioner of Patents, Washington, D. C."